United States Patent
Roman (10) Patent No.: US 11,047,408 B2
(45) Date of Patent: Jun. 29, 2021

(54) CONSTRUCTION CLIP

(71) Applicant: John Roman, Linden, NJ (US)

(72) Inventor: John Roman, Linden, NJ (US)

( * ) Notice: Subject to any disclaimer, the term of this patent is extended or adjusted under 35 U.S.C. 154(b) by 288 days.

(21) Appl. No.: 16/238,209

(22) Filed: Jan. 2, 2019

(65) Prior Publication Data
US 2020/0208658 A1 Jul. 2, 2020

(51) Int. Cl.
*F16B 2/06* (2006.01)
*F16L 3/24* (2006.01)
*E04C 3/04* (2006.01)

(52) U.S. Cl.
CPC ............ *F16B 2/065* (2013.01); *F16L 3/24* (2013.01); *E04C 3/04* (2013.01); *E04C 2003/0452* (2013.01)

(58) Field of Classification Search
CPC combination set(s) only.
See application file for complete search history.

(56) References Cited

U.S. PATENT DOCUMENTS

| | | | | |
|---|---|---|---|---|
| 854,209 A * | 5/1907 | Goss | ............ | H02G 3/125 248/205.1 |
| 2,529,153 A * | 11/1950 | Hain | ............ | H01R 4/64 238/14.14 |
| 4,036,546 A * | 7/1977 | Thompson | ............ | H01R 4/304 439/435 |
| 5,897,088 A * | 4/1999 | Kirschner | ............ | F16B 2/02 248/300 |
| 5,947,424 A * | 9/1999 | Heath | ............ | F16B 21/16 248/228.1 |
| 6,877,996 B1 * | 4/2005 | Franks, Jr. | ............ | H01R 4/42 439/782 |
| 7,654,043 B2 * | 2/2010 | Heath | ............ | F16L 3/133 52/167.3 |
| 7,806,375 B1 * | 10/2010 | Kirschner | ............ | F16L 3/24 248/72 |
| 8,235,331 B2 * | 8/2012 | McIntosh | ............ | F16L 3/1226 248/58 |
| 8,985,351 B1 * | 3/2015 | Longo | ............ | A47F 3/0404 211/163 |
| 9,385,513 B2 * | 7/2016 | Jones | ............ | H02G 3/30 |
| D859,957 S * | 9/2019 | Flederbach | ............ | D8/349 |
| 10,612,573 B2 * | 4/2020 | Recker | ............ | F16B 2/12 |
| 2019/0072214 A1 * | 3/2019 | Ramsey | ............ | F16L 3/22 |

* cited by examiner

*Primary Examiner* — Monica E Millner
(74) *Attorney, Agent, or Firm* — Mintz Levin Cohn Ferris Glovsky and Popeo, P.C.

(57) ABSTRACT

A construction retention system. The system includes a construction clip having a body portion coupled to an elongated portion and a shortened portion. The body portion includes a carrying rod receiving portion disposed between elongated portion and the shortened portion. The clip includes a first tab coupled to a proximate end of the body portion. The carrying rod receiving portion receives a carrying rod. The first tab receives a tensioning wire. The system further includes a beam clamp removably secured to an I-beam and secures the carrying rod. The construction clip is removably secured to the beam clamp and to the carrying rod. The tensioning wire tension-secures the construction clip to the carrying rod and the beam clamp.

13 Claims, 7 Drawing Sheets

CONSTRUCTION CLIP

TECHNICAL FIELD

In some implementations, the current subject matter generally relates to reducing construction, and in particular, to a construction clip.

BACKGROUND

Construction and civil engineering industries use various elements for support of structural aspects of buildings, foundations, walls, etc. Some of these elements include I-beams (also known as H-beam (for universal column ("UC")), w-beam ("wide flange"), universal beam ("UB"), rolled steel joist ("RSJ"), or double-T beam). The I-beam is a beam that has an I or H-shaped cross-section. The horizontal elements of the "I" are referred to as flanges and the vertical element is referred to as the "web". I-beams are typically manufactured from structural steel or aluminum. The web portion is designed to resist shear forces and the flanges are designed to resist most of the bending moment experienced by the beam. The I-beam is a very efficient for carrying both bending and shear loads in the plane of the web. Further, the cross-section of the I-beam has a reduced capacity in the transverse direction, and is inefficient in carrying torsion, for which hollow structural sections are used.

Beam clamps (e.g., junior beam clamps) are typically used with I-beams for the purposes of hanging or providing support to a rod (e.g., a threaded rod), which is used to carry a load. To ensure that the rod is securely coupled to the I-beam, a retaining strap is used. However, conventional beam clamps are difficult to install and remove (e.g., in retrofit situations) and do not provide the requisite stability to the carrying rod. As such, there is a need for a construction element that provides an increased support to beam clamps so as to ensure stability to the carrying rod coupled to an I-beam.

SUMMARY

In some implementations, the current subject matter relates to a construction retention system. The system can include a construction clip having a body portion coupled to an elongated portion and a shortened portion. The body portion can include a carrying rod receiving portion disposed between elongated portion and the shortened portion. The clip can also include a first tab coupled to a proximate end of the body portion. The carrying rod receiving portion can be configured to receive a carrying rod. The first tab can be configured to receive a tensioning wire.

The system can also include a beam clamp configured to be removably secured to an I-beam and further configured to secure the carrying rod. The construction clip can be configured to be removably secured to the beam clamp and to the carrying rod. The system can include the tensioning wire that can be configured to tension-secure the construction clip to the carrying rod and the beam clamp.

In some implementations, the current subject matter can include one or more of the following optional features. The system can also include a stopping mechanism secured to a first end of a flange portion of the I-beam. The tensioning wire can be secured to the stopping mechanism. The beam clamp, while securing the carrying rod, can be secured to a second end of the flange portion of the I-beam. The system above can further include a wire tensioning mechanism for tension-securing the tensioning wire. The tensioning wire can be configured to extend from the stopping mechanism through an opening in the first tab of the construction clip and through the wire tensioning mechanism. The first tab and the wire tensioning mechanism can prevent the tensioning wire from losing tension generated by the wire tensioning mechanism (such as when the tensioning wire is extended/stretched between the stopping mechanism and the wire tension mechanism).

In some implementations, the first tab can be bent in a downward direction and away from the beam clamp and the I-beam. The construction clip can also include a second tab coupled to a distal end of the elongated portion of the construction clip. The second tab can be configured to be bent in an upward direction and toward the beam clamp and the I-beam. The first tab and/or the second tab can be configured to be bent at a predetermined angle to the construction clip, as discussed above.

In some implementations, the carrying rod receiving portion can have a circular portion. The construction clip can be manufactured from at least one of the following: stainless steel, iron, aluminum, metal alloys, carbon, plastic, and/or any combination thereof.

In some implementations, the current subject matter relates to a construction clip. The clip can include a body portion coupled to an elongated portion and a shortened portion. The body portion can include a carrying rod receiving portion disposed between elongated portion and the shortened portion. The carrying rod receiving portion can be configured to receive a carrying rod. The clip can also include a first tab having an opening and being coupled to a proximate end of the body portion. The first tab can be configured to receive a tensioning wire, wherein the first tab is configured to be bent in a downward direction. The clip can include a second tab coupled to a distal end of the elongated portion. The second tab can be configured to be bent in an upward direction.

In some implementations, the current subject matter's construction clip can include one or more of the following optional features. The construction clip can be configured to be removably secured to a beam clamp and to the carrying rod, wherein the beam clamp configured to be removably secured to an I-beam and further configured to secure the carrying rod. The tensioning wire can be configured to tension-secure the construction clip to the carrying rod and the beam clamp.

In some implementations, a stopping mechanism can be configured to be secured to a first end of a flange portion of the I-beam. The tensioning wire can be secured to the stopping mechanism. The beam clamp, while securing the carrying rod, can be secured to a second end of the flange portion of the I-beam. A wire tensioning mechanism can be configured to tension-secure the tensioning wire. The tensioning wire can be configured to extend from the stopping mechanism through an opening in the first tab of the construction clip and through the wire tensioning mechanism. The first tab and the wire tensioning mechanism can prevent the tensioning wire from losing tension generated by the wire tensioning mechanism.

In some implementations, the first tab can be bent away from the beam clamp and the I-beam. The second tab can be configured to be bent toward the beam clamp and the I-beam. The first tab and/or the second tab can be configured to be bent at a predetermined angle to the construction clip.

In some implementations, the carrying rod receiving portion can have a circular portion. As stated above, the construction clip can be manufactured from at least one of the following: stainless steel, iron, aluminum, metal alloys, carbon, plastic, and/or any combination thereof.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Some embodiments of the current subject matter relate to a construction clip that is configured to provide support to a I-beam clamp securing a carrying rod to the I-beam. The current subject matter's clip can be configured to ensure that the I-beam clamp is securely attached to the I-beam, is easy to install/remove/re-install (e.g., in retrofit situations), and can provide the requisite seismic stability to the carrying rod coupled to the I-beam.

Figure 5:
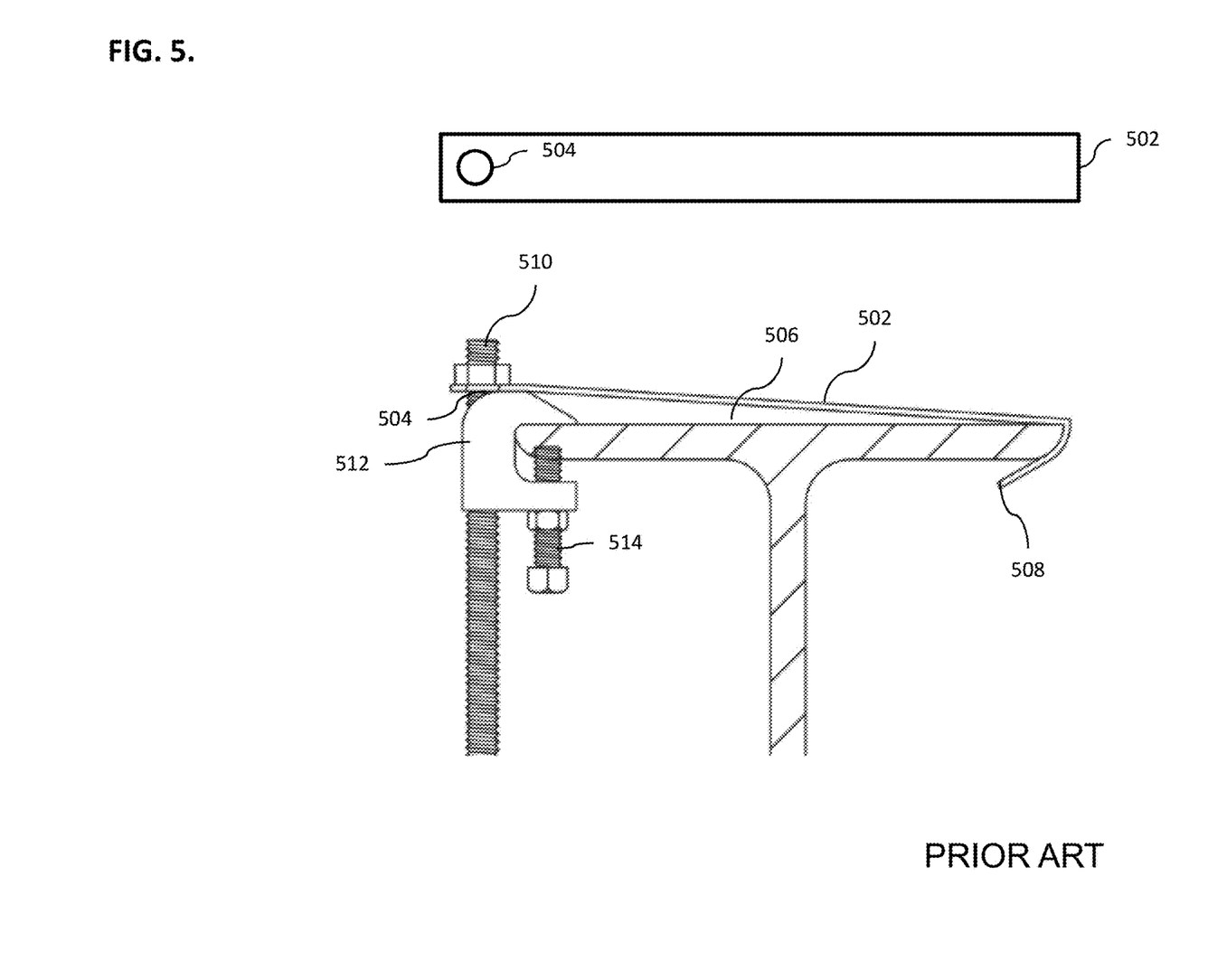
FIG. 5 illustrates use of a conventional retaining strap.

As stated above, when securing carrying rod to an I-beam, a beam clamp and a retaining strap are used. Conventional retaining strap can be used to provide supplemental support/security for the carrying rod/beam clamps attached to the I-beam. FIG. 5 illustrates use of a conventional retaining strap 502. The retaining strap 502 is typically a flat elongated steel member that has a small opening or a slit 504 at one end. The opening 504 in the strap 502 can be used for protruding through a carrying rod 510 while the rod 510 is secured to the I-beam using a beam clamp 512. The beam clamp 512 is secured one end of a flange portion 506 of the I-beam using a bolt 514 (or any other mechanism). The bolt 514 can be a tension bolt and can be designed to protrude through a portion of the flange portion 506.

The strap 502 is positioned above the flange portion 506 and the beam clamp 512, as shown in FIG. 5. The strap 502 has an end 508, opposite the end having the opening 504. The end 508 is bent around an end of the flange portion 506 of the I-beam that is opposite the end of the flange portion 506 to which the carrying rod 510 is secured using the beam clamp 512. During installation, the carrying rod 510 is coupled to the beam clamp 512 and is protruded through the opening 504 of the strap 502 and can be further secured using a nut that is threaded on the carrying rod 510. By having the end 508 bend around the strap 502 and the end with the opening 504 secured to the carrying rod 510, the strap 502 provides added security to the carrying rod 510. Other configurations of the strap 502 exist, where the strap 502 can attach to the carrying rod and/or clamp in different fashion. The strap 502 can be attached at both flange portions of the I-beam (only one flange portion is shown in FIG. 5).

In various conventional systems, when junior beam clamps are used with an I-beam, retaining straps cannot be properly secured to the I-beam. This is because, as shown in FIG. 5, the retaining strap 502, when secured to the carrying rod 510 and around one end of the flange portion of the I-beam, does not extend flat across the flange portion of the I-beam (i.e., it extends at an angle to the top surface of the flange portion and is not flush against it, as shown in FIG. 5). Hence, the strap 502 is not securely coupled around the I-beam and especially, at the strap's end 508. Additionally, because I-beams are typically placed with their flange portions against a flat surface that they are designed to support, the conventional straps can only be secured at one flange portion of the I-beam (as shown in FIG. 5). Moreover, such attachment of straps typically requires inverse positioning of beam clamps, which can be labor intensive during installations/removal/re-installations (e.g., particularly in retrofit applications). Additionally, the conventional straps do not provide the requisite seismic stability to ensure that carrying rods securely support their loads. The current subject matter's construction clip provides a solution to the above drawbacks.

Figure 1:
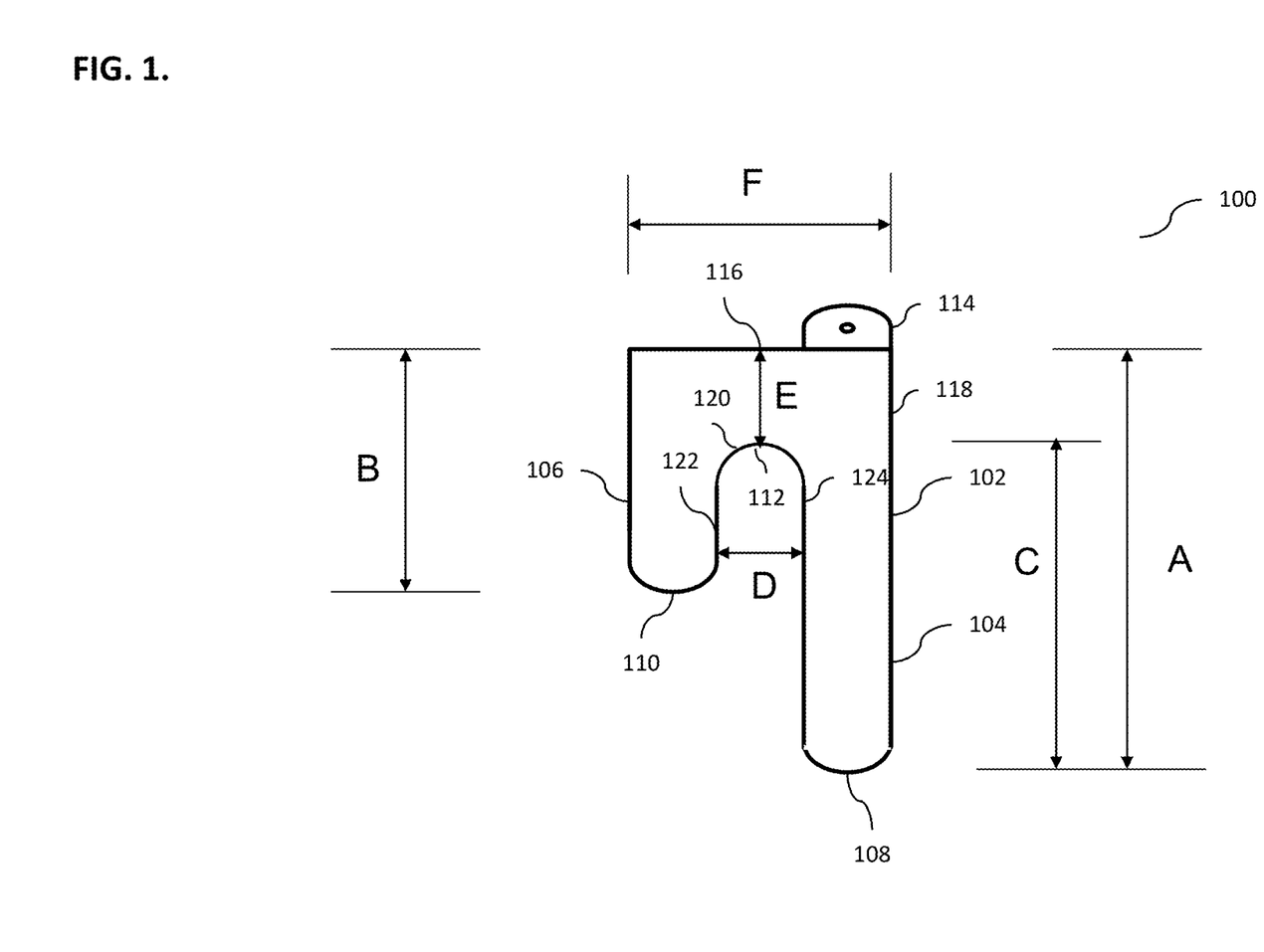
FIG. 1 illustrates an exemplary construction clip, according to some implementations of the current subject matter.
Figure 2A:
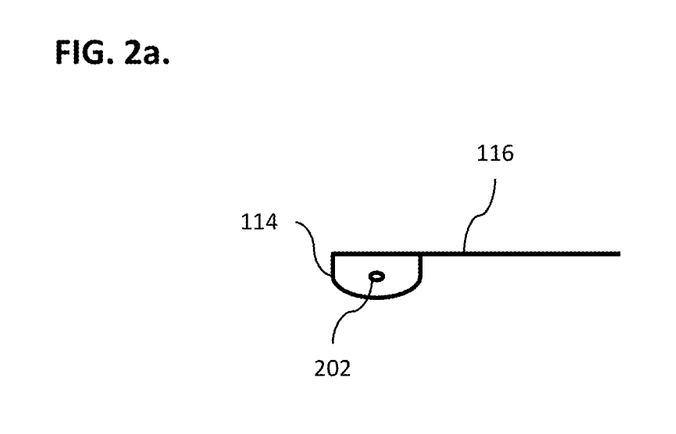
FIGS. 2a-b illustrate further detail of the construction clip shown in FIG. 1.
Figure 4:
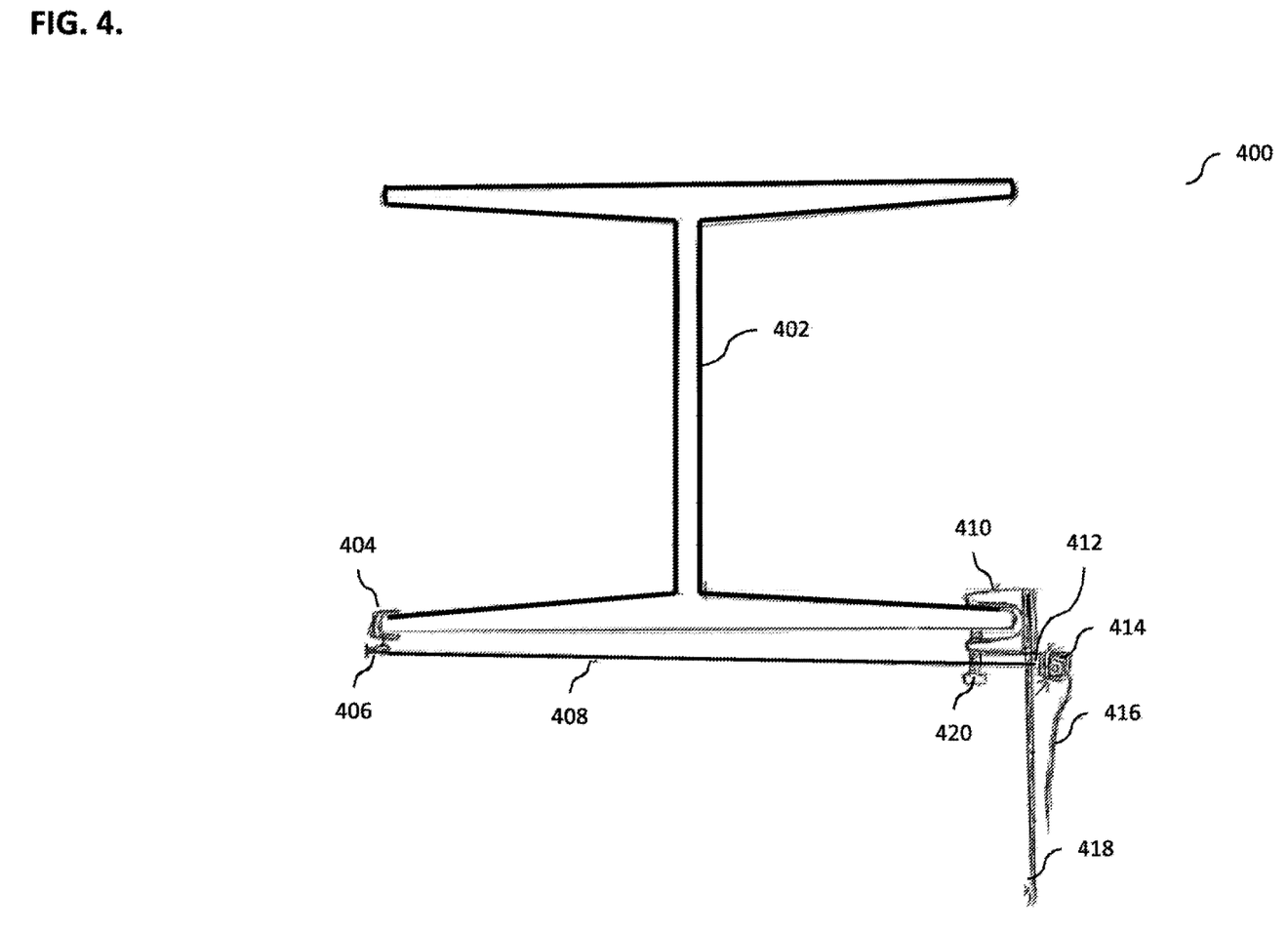
FIG. 4 illustrates an exemplary construction system, according to some implementations of the current subject matter.

FIG. 1 illustrates an exemplary construction clip 100, according to some implementations of the current subject matter. FIG. 1 illustrates a top view of the clip 100. The clip 100 can include a housing portion 102, a body portion 118, an elongated portion 104, a carrying rod receiving portion 112, a shortened portion 106, and a tab 114. The body portion 118 can be coupled to the elongated portion 104 and the shortened portion 106. The tab 114 can be configured to be coupled to a proximate end 116 of the body portion. The tab 114 can also include an opening 202 (as shown in FIG. 2a). The opening can be used for protruding a securing tension wire (as shown in FIG. 4). The elongated portion 104 can be configured to have a distal end 108 and the shortened end 106 can be configured to have a distal end 110.

In some implementations, the elongated portion 106 can be configured to provide stability and guidance during securing of the carrying rod (not shown in FIG. 1) to a beam clamp (not shown in FIG. 1) using a securing tension wire. The length of the elongated portion 106 from the proximate end 116 to the distal end 108 can be defined as length A, as shown in FIG. 1. The length A can vary and can be dependent on the sizes of the beam clamp, diameter of the carrying rod, etc. In some exemplary, non-limiting implementations, length A can be in the range of approximately 0.75 inches to 2 inches, and more particularly, can be approximately 1.75 inches.

The length of the shortened portion 106 can be defined as length B, as shown in FIG. 1. Similarly to length A, length B can vary and can be dependent on the sizes of the beam clamp, diameter of the carrying rod, etc. In some exemplary, non-limiting implementations, length B can be in the range of approximately 0.5 inches to 1.25 inches, and more particularly, can be approximately 0.875 inches.

The carrying rod receiving portion 112 can be defined by a circular portion 120 and sidewalls 122, 124 between which the circular portion 120 is disposed. The sidewall 122 can include at least a part of the shortened portion 106. The sidewall 124 can include at least a part of the elongated portion 104. The diameter of the circular portion 120 can be defined by the distance D between the sidewalls 122 and 124, as illustrated in FIG. 1. In some implementations, the sidewalls 122 and 124 can be configured to be parallel. In some exemplary, non-limiting implementations, distance D can be in the range of approximately 0.125 inches to 0.625 inches, and more particularly, can be approximately 0.375 inches. Alternatively, the sidewalls 122 and 124 can be disposed at an angle with respect to one another, which may be helpful during installations of the beam clamp that may require additional accessibility.

Additionally, the carrying rod receiving portion 112 can be further include a depth, i.e., how far into the body portion 118 the carrying rod receiving portion 112 is configured to protrude. Such depth can be defined by distance E shown in FIG. 1, which can correspond to the distance between the proximate end 116 and the circular portion 120 as well as the distance C, which is the distance from the top of the circular portion 120 to the distal end 108. In some exemplary, non-limiting implementations, distance E can be in the range of approximately 0.125 inches to 0.625 inches, and more particularly, can be approximately 0.375 inches. In some exemplary, non-limiting implementations, distance C can be in the range of approximately 1 inch to 1.75 inches, and more particularly, can be approximately 1.375 inches.

The width of the body portion 118 can be defined by the distance F between outer edges of the shortened portion 106 and the elongated portion 104. In some exemplary, non-limiting implementations, width F can be in the range of approximately 0.5 inches to 1.25 inches, and more particularly, can be approximately 1.0 inch.

The tab 114 can be defined by the length that extends away from the proximate end 116 of the body portion 118 as well as the width (perpendicular to the length). In some exemplary, non-limiting implementations, the length of the tab 114 can be in the range of approximately 0.25 inches to 0.75 inches, and more particularly, can be approximately 0.5 inches, and the width of the tab 114 can be in the range of approximately 0.125 inches to 0.75 inches, and more particularly, can be approximately 0.375 inches. In some implementations, as stated above, the tab 114 can include an opening 202 (shown in FIG. 2*a*) for accommodating insertion of a tension wire. In some exemplary, non-limiting implementations, the radius of the opening in the tab 114 can be in the range of approximately 0.0625 inches to 0.25 inches, and more particularly, can be approximately 0.125 inches.

In some implementations, the thickness of the clip 100 can be uniform and/or can be variable. The surface of the clip 100 can include various etches, openings, etc. that can accommodate various construction needs (e.g., an etching at a location where the tab 114 is coupled to the body 118 that would allow easier bending of the tab 114). In some exemplary, non-limiting implementations, the thickness of the clip 110 can be in the range of approximately 0.03125 inches to 0.125 inches, and more particularly, can be approximately 0.0625 inches. As can be understood, any other dimensions, thicknesses, sizes, etc. are possible and the current subject matter is not limited to the specific values indicated above.

In some exemplary, non-limiting, implementations, the clip 100 can be manufactured from stainless steel, iron, aluminum, metal alloys, carbon, plastic, and/or any other suitable materials, and/or any combination thereof.

Figure 2B:
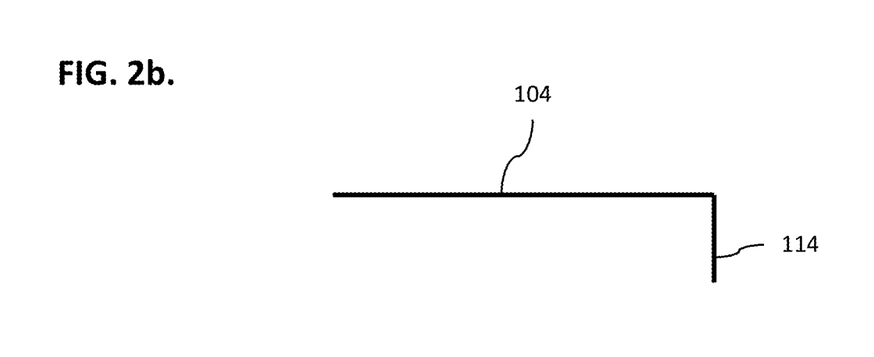

FIG. 2*a* is a side view of the clip 100 that illustrates the tab 114 being bent away from the surface of the body portion 118. The tab 114 can be at a 90 degree angle with regard to the surface of the body portion 118, as, for example, is shown in FIG. 2*b*, which illustrates another side view of the tab 114 being bent. Alternatively, the tab 114 can be bent at any angle with respect to the surface of the body portion 118. Further, the tab 114 can be bent in a downward or upward direction with regard to the top/bottom surfaces of the body portion 118. In some alternative implementations, the tab 114 can be bent non-uniformly with respect to the surface of the body portion 118. For example, a portion of the tab can be bent at a greater angle with regard to the surface of the body portion 118 than another portion of the tab 114, thereby resulting in a twisted bend. The tab 114 can be bent using any known means (e.g., hammer, pliers, by hand, automatically, etc.). Alternatively, the clip 100 can be manufactured with the tab 114 already bent in a desired fashion.

Figure 3A:
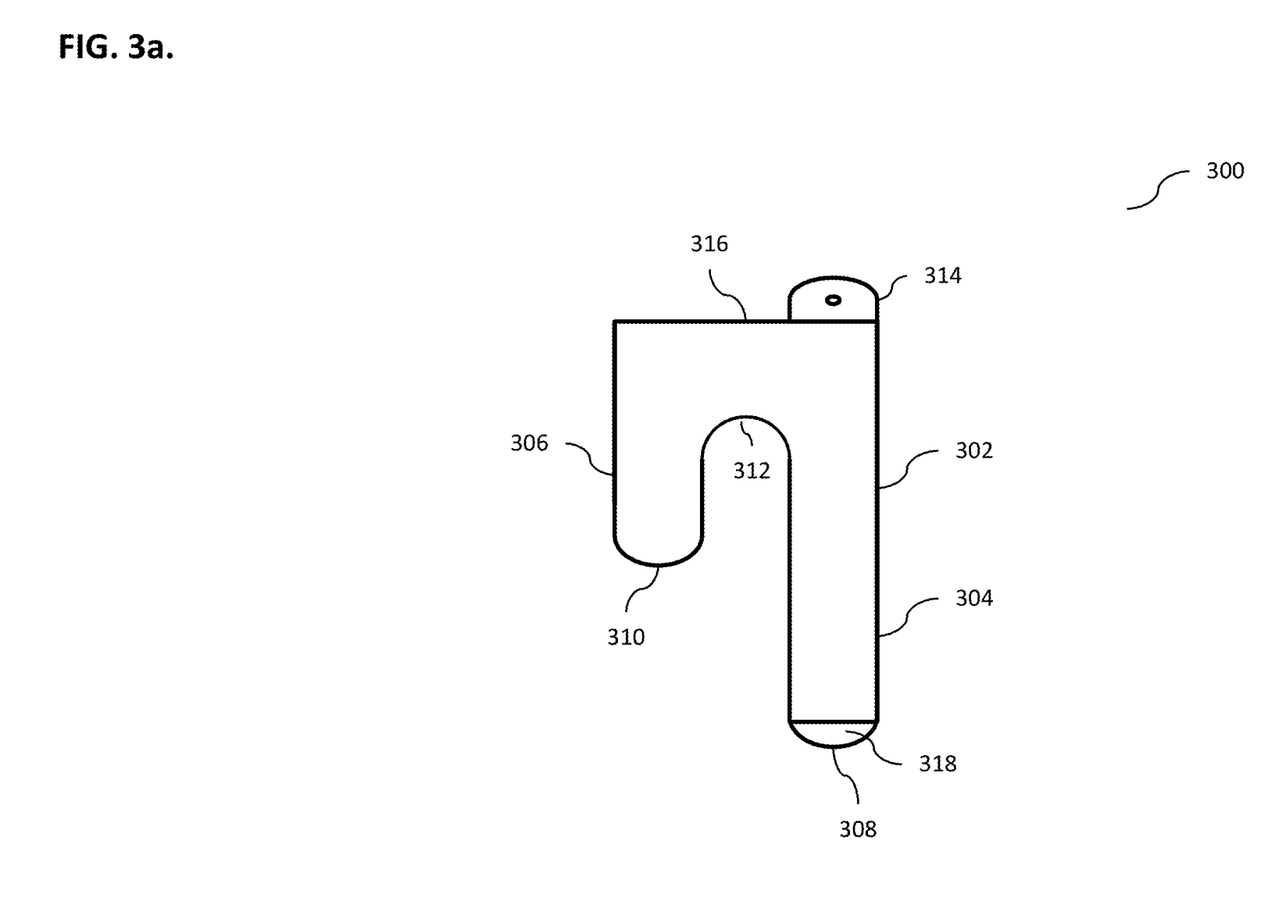
FIGS. 3a-b illustrate another exemplary construction clip, according to some implementations of the current subject matter.
Figure 3B:
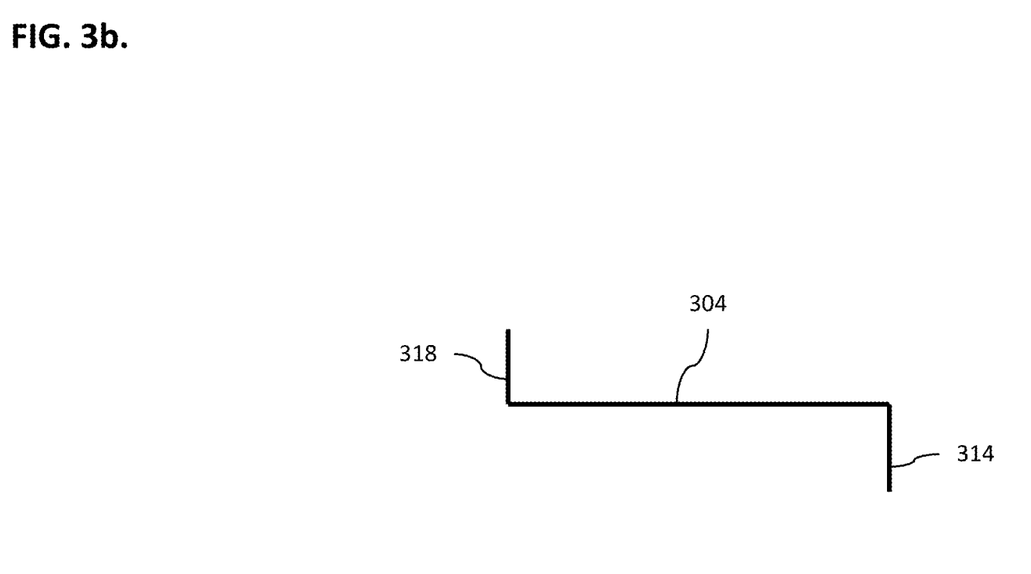

FIGS. 3*a* and 3*b* illustrate another exemplary construction clip 300, according to some implementations of the current subject matter. The clip 300 can be similar to the clip 100 shown in FIG. 1. The FIG. 3*a* illustrates a top view of the clip 300. The clip 300 can include a housing portion 302, an elongated portion 304, a carrying rod receiving portion 312, a shortened portion 306, and a tab 314. Similar to clip 100, the tab 314 can be configured to be coupled to a proximate end 316. The tab 314 can also include an opening (e.g. similar to opening 202 (as shown in FIG. 2)). The opening can be used for protruding a securing tension wire (as shown in FIG. 4). The elongated portion 304 can be configured to have a distal end 308 and the shortened end 306 can be configured to have a distal end 310.

The elongated portion 308 can include a tab 318. Similar to the tab 314, the tab 318 can be configured to be bent (such as around a beam clamp (not shown in FIG. 3*a*)) and provide enhanced security when the clip 300 is used. The tabs 314, 318 can be bent at any angle and in any direction. For example, as shown in FIG. 3*b* (illustrating a side view of the clip 300), the tab 314 can be bent in a downward direction and tab 318 can be bent in an upward direction. The downward direction bending of tab 314 can allow protrusion of securing tension wire (not shown in FIG. 3*b*) and the upward direction bending of tab 318 can allow the tab 318 to be secured (or bent) over an end of a beam clamp.

FIG. 4 illustrates an exemplary construction system 400, according to some implementations of the current subject matter. The system 400 can include an I-beam 402 having top and bottom flange portions. A beam clamp 410 can be configured to be secured to the bottom flange portion of the I-beam 402. The beam clamp 410 can be any known beam clamp (e.g., a junior beam clamp, and/or any other type of beam clamp) and can be configured to secure a load carrying rod 418 to the I-beam 402. The beam clamp 410 can be secured at one end of the bottom flange portion using a bolt 420 that can be threaded through a portion of the beam clamp 410 to create a tensioned fixation of the beam clamp 410 to the I-beam 402. At an opposite end of the bottom flange portion, a beam clip 404 can be secured. The beam clip 404 can be any known beam clip and can include a stopper mechanism 406 that is configured to secure a tension wire 408 (e.g., wire rope, a twisted metal wire, etc.). The tension wire 408 can be any known tension wire and can have any desired diameter (e.g., 1.5 millimeter, etc.). The tension wire 408 can be configured to extend along the bottom flange portion toward the end of the bottom flange portion to which beam clamp 410 is secured.

As shown in FIG. 4, the clip 412 (similar to clips 100 and 300 shown in FIGS. 1, 3*a-b*, respectively, and having similar components) can be secured to the beam clamp 410 with the rod 418 protruding through clip 412's carrying rod receiving portion (similar to portion 112 shown in FIG. 1). The tab of the clip 412 can be bent in a downward direction, as described above. The tension wire 408 can be protruded through an opening in the tab of the clip 412. A wire locking device 414 (e.g., any known speed link wire rope locking device) can be used to secure and hold the tension wire 408 to ensure that the wire 408 is tensioned between the stopper 406 and the wire locking device 414. An excess 416 of the tension wire 408 can be protruded away from the wire locking device 414 and allowed to hang loose.

Figure 6A:
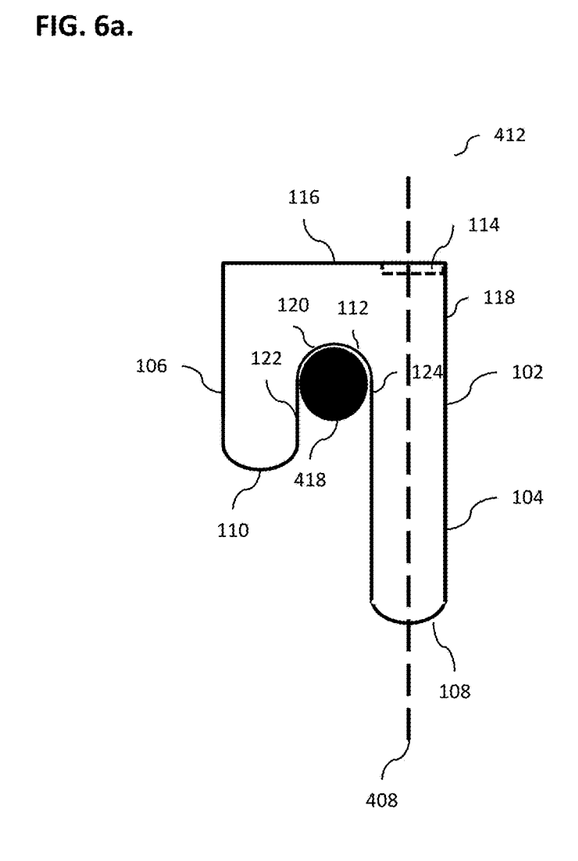
FIGS. 6a-c illustrate an exemplary construction system, according to some implementations of the current subject matter.
Figures 6B, 6C:
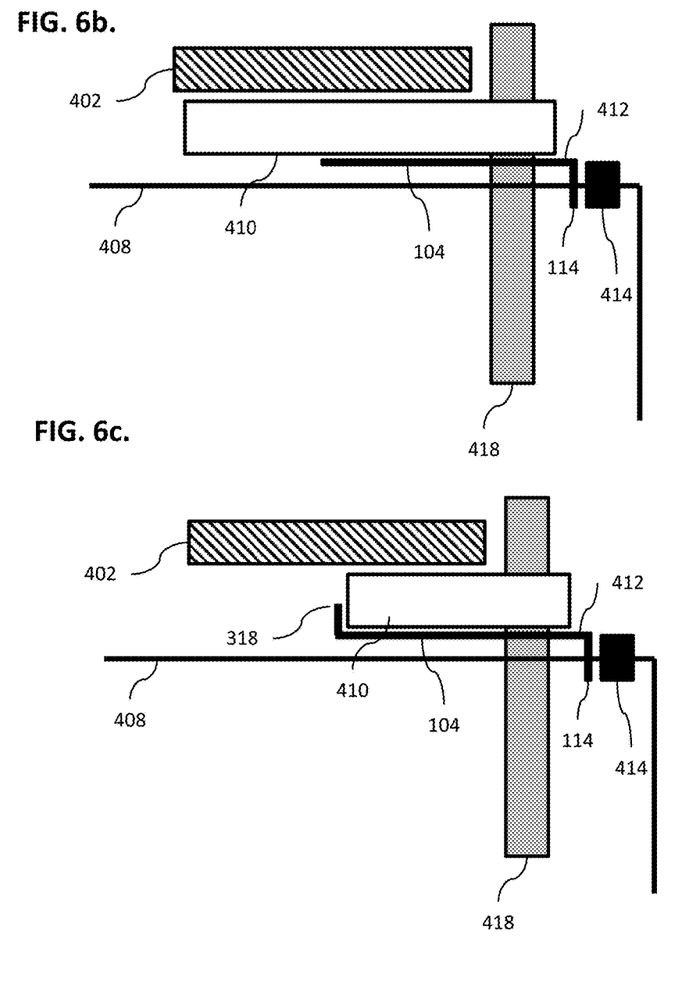

FIGS. 6a and 6b illustrate further details of the system 400 shown in FIG. 4. FIG. 6a illustrates a top view of the clip 412 (having components of the clip 100 shown in FIG. 1) while in use. FIG. 6b illustrates a side view of the clip 412 while in use.

As shown in FIG. 6a, the wire 408 is configured to protrude underneath the clip 412 and through an opening in the tab 114 (shown in dashed lines), where the tab 114 is bent in the downward direction and away from the beam clamp 410 (as shown in FIG. 6b). The load carrying rod 418 can be configured to be positioned in the carrying rod receiving portion 112. The rod 418 can be configured to friction fit in the carrying rod receiving portion 112, thereby providing outmost stability to the rod 418 and the entire assembly 400 shown in FIG. 4. Alternatively, the rod 418 can be configured to loosely fit inside the portion 112, where a space can be created between the walls 120-124 of the portion 112 and outer wall of the rod 418.

As stated above, FIG. 6b is a side view of the clip 412 while in use, where the clip 412 is positioned underneath the beam clamp 410 (only a portion of the beam clamp 410 is shown in FIG. 6b for ease of illustration), which is secured around one of the ends of the bottom flange portion of the I-beam 402 (again, only a portion of the I-beam and its bottom flange portion is shown in FIG. 6b and beam clamp's securing bolt is not shown in FIG. 6b for ease of illustration).

The carrying rod 418 (portion of which is shown in FIG. 6b) is configured to be secured to the beam clamp 410 and is configured to be positioned in the carrying rod receiving portion 112 (as shown in FIG. 6a) between the elongated portion 104 of the clip 412 (shown in FIG. 6b) and the shortened portion 106 (not shown in FIG. 6b). The clip 412 can be configured to be positioned substantially flush against a bottom surface of the beam clamp 410. The tab 114 of the clip 412 can be configured to be bent downward and away from the beam clamp 410. The tension wire 408 is configured to protrude through the opening 202 (not shown in FIG. 6b) and be secured using a tensioning device 414 with excess of the wire 408 extending beyond the device 414.

By securing the clip 412 to the beam clamp using the tensioning wire 408, the rod 418 can be configured to be firmly secured to the I-beam. This in turn provides necessary stability to the load that is being supported by the carrying rod 418.

In some exemplary implementations, the tab 318 (as shown in FIG. 3) can be bent in an upward direction around a distal end of the beam clamp 410 to further secure the clip 412 to the clamp 410. As shown in FIG. 6c, the tab 318 can be bent in opposite direction to the tab 114.

It should be noted that various components shown in FIGS. 6a-b may or may not have spacings between them. Any spaces shown in these figures are for illustrative purposes and for better explanation/understanding of the arrangements of these components only.

In some implementations, the system 400 (as shown in FIGS. 4, 6a-b) can be configured to provide support to various loads in construction. For example, the system 400 can be used to support fluid lines, such as water pipes, gas lines, electrical cabling, and/or any other loads from I-beams. Instead of the conventional retaining strap, the construction clip described in the present application can provide additional stability to the loads being carried by the carrying rod and/or the beam clamp to reduce effects of vibration, seismic instability, contraction, movement of components during construction, etc. Moreover, the construction clip allows easy installation, removal, and/or re-installation. It allows users to work in small spaces, where use of large tools, swinging of hammers, etc. might not be possible. The use of the construction clip and along with the tension wire, as shown in FIG. 4, can allow adjustability of the system, whereby any size I-beam, beam clamp, carrying rod can be used.

In some implementations, the current subject matter relates to a construction retention system. The system (e.g., system 400) can include a construction clip (e.g., clip 100, 300, 412) having a body portion (e.g., body portion 118) coupled to an elongated portion (e.g., elongated portion 104) and a shortened portion (e.g., shortened portion 106). The body portion can include a carrying rod receiving portion (e.g., portion 112) disposed between elongated portion and the shortened portion. The clip can also include a first tab (e.g., tab 114) coupled to a proximate end (e.g., proximate end 116) of the body portion. The carrying rod receiving portion can be configured to receive a carrying rod (e.g., rod 418). The first tab can be configured to receive a tensioning wire (e.g., tensioning wire 408).

The system can also include a beam clamp (e.g., beam clamp 410) configured to be removably secured to an I-beam (e.g., I-beam 402) and further configured to secure the carrying rod. The construction clip can be configured to be removably secured to the beam clamp and to the carrying rod. The system can include the tensioning wire that can be configured to tension-secure (as shown in FIG. 4 for example) the construction clip to the carrying rod and the beam clamp.

In some implementations, the current subject matter can include one or more of the following optional features. The system can also include a stopping mechanism (e.g., stopping mechanism 406) secured to a first end of a flange portion of the I-beam. The tensioning wire can be secured to the stopping mechanism (as shown in FIG. 4). The beam clamp, while securing the carrying rod, can be secured to a second end of the flange portion of the I-beam. The system above can further include a wire tensioning mechanism (e.g., mechanism 414) for tension-securing the tensioning wire. The tensioning wire can be configured to extend from the stopping mechanism (e.g., mechanism 406) through an opening (e.g., opening 202) in the first tab (e.g., tab 114) of the construction clip and through the wire tensioning mechanism. The first tab and the wire tensioning mechanism can prevent the tensioning wire from losing tension generated by the wire tensioning mechanism (such as when the tensioning wire is extended/stretched between the stopping mechanism 406 and the wire tension mechanism 414).

In some implementations, the first tab can be bent in a downward direction and away from the beam clamp and the I-beam (as shown, for example, in FIGS. 2a-b, 6b). The construction clip can also include a second tab (e.g., tab 318) coupled to a distal end of the elongated portion of the construction clip. The second tab can be configured to be bent in an upward direction and toward the beam clamp and the I-beam (as shown, for example, in FIGS. 3b and 6c). The first tab and/or the second tab can be configured to be bent at a predetermined angle to the construction clip, as discussed above.

In some implementations, the carrying rod receiving portion can have a circular portion (as shown in FIG. 1). The construction clip can be manufactured from at least one of the following: stainless steel, iron, aluminum, metal alloys, carbon, plastic, and/or any combination thereof.

In some implementations, the current subject matter relates to a construction clip (e.g., clip 100, 300, 412). The clip can include a body portion coupled to an elongated portion and a shortened portion. The body portion can include a carrying rod receiving portion disposed between elongated portion and the shortened portion. The carrying rod receiving portion can be configured to receive a carrying rod. The clip can also include a first tab having an opening and being coupled to a proximate end of the body portion. The first tab can be configured to receive a tensioning wire, wherein the first tab is configured to be bent in a downward direction. The clip can include a second tab coupled to a distal end of the elongated portion. The second tab can be configured to be bent in an upward direction.

In some implementations, the current subject matter's construction clip can include one or more of the following optional features. The construction clip can be configured to be removably secured to a beam clamp and to the carrying rod, wherein the beam clamp configured to be removably secured to an I-beam and further configured to secure the carrying rod. The tensioning wire can be configured to tension-secure the construction clip to the carrying rod and the beam clamp.

In some implementations, a stopping mechanism can be configured to be secured to a first end of a flange portion of the I-beam. The tensioning wire can be secured to the stopping mechanism. The beam clamp, while securing the carrying rod, can be secured to a second end of the flange portion of the I-beam. A wire tensioning mechanism can be configured to tension-secure the tensioning wire. The tensioning wire can be configured to extend from the stopping mechanism through an opening in the first tab of the construction clip and through the wire tensioning mechanism. The first tab and the wire tensioning mechanism can prevent the tensioning wire from losing tension generated by the wire tensioning mechanism.

In some implementations, the first tab can be bent away from the beam clamp and the I-beam. The second tab can be configured to be bent toward the beam clamp and the I-beam. The first tab and/or the second tab can be configured to be bent at a predetermined angle to the construction clip.

In some implementations, the carrying rod receiving portion can have a circular portion. As stated above, the construction clip can be manufactured from at least one of the following: stainless steel, iron, aluminum, metal alloys, carbon, plastic, and/or any combination thereof.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

Example embodiments of the methods and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few implementations have been described in detail above, other modifications or additions are possible. In particular, further features and/or implementations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:
1. A construction retention system, comprising:
   a construction clip having
      a body portion coupled to an elongated portion and a shortened portion, the body portion including a carrying rod receiving portion disposed between elongated portion and the shortened portion;
      a first tab coupled to a proximate end of the body portion;
      the carrying rod receiving portion is configured to receive a carrying rod;
      the first tab is configured to receive a tensioning wire;
   a beam clamp configured to be removably secured to an I-beam and further configured to secure the carrying rod, wherein the construction clip is configured to be removably secured to the beam clamp and to the carrying rod;
   the tensioning wire configured to tension-secure the construction clip to the carrying rod and the beam clamp;
   a stopping mechanism secured to a first end of a flange portion of the I-beam, the tensioning wire is secured to the stopping mechanism, wherein the beam clamp, while securing the carrying rod, is secured to a second end of the flange portion of the I-beam; and
   a wire tensioning mechanism for tension-securing the tensioning wire, wherein the tensioning wire is configured to extend from the stopping mechanism through an opening in the first tab of the construction clip and through the wire tensioning mechanism, the first tab and the wire tensioning mechanism preventing the tensioning wire from losing tension generated by the wire tensioning mechanism.

2. The system according to claim 1, wherein the first tab is bent in a downward direction and away from the beam clamp and the I-beam.

3. The system according to claim 1, further comprising a second tab coupled to a distal end of the elongated portion of the construction clip, wherein the second tab is configured to be bent in an upward direction and toward the beam clamp and the I-beam.

4. The system according to claim 3, wherein the first tab and/or the second tab are configured to be bent at a predetermined angle to the construction clip.

5. The system according to claim 1, wherein the carrying rod receiving portion has a circular portion.

6. The system according to claim 1, wherein the construction clip is manufactured from at least one of the following: stainless steel, iron, aluminum, metal alloys, carbon, plastic, and/or any combination thereof.

7. A construction clip, comprising
a body portion coupled to an elongated portion and a shortened portion, the body portion including a carrying rod receiving portion disposed between elongated portion and the shortened portion, the carrying rod receiving portion is configured to receive a carrying rod;
a first tab having an opening and being coupled to a proximate end of the body portion, the first tab is configured to receive a tensioning wire, wherein the first tab is configured to be bent in a downward direction; and
a second tab coupled to a distal end of the elongated portion, wherein the second tab is configured to be bent in an upward direction;
wherein
a stopping mechanism is configured to be secured to a first end of a flange portion of the I-beam, the tensioning wire is secured to the stopping mechanism;
the beam clamp, while securing the carrying rod, is secured to a second end of the flange portion of the I-beam;
a wire tensioning mechanism is configured to tension-secure the tensioning wire, wherein the tensioning wire is configured to extend from the stopping mechanism through an opening in the first tab of the construction clip and through the wire tensioning mechanism, the first tab and the wire tensioning mechanism preventing the tensioning wire from losing tension generated by the wire tensioning mechanism.

8. The construction clip according to claim 7, wherein the construction clip is configured to be removably secured to a beam clamp and to the carrying rod, wherein the beam clamp configured to be removably secured to an I-beam and further configured to secure the carrying rod;
the tensioning wire configured to tension-secure the construction clip to the carrying rod and the beam clamp.

9. The construction clip according to claim 7, wherein the first tab is bent away from the beam clamp and the I-beam.

10. The construction clip according to claim 7, wherein the second tab is configured to be bent toward the beam clamp and the I-beam.

11. The construction clip according to claim 10, wherein the first tab and/or the second tab are configured to be bent at a predetermined angle to the construction clip.

12. The construction clip according to claim 7, wherein the carrying rod receiving portion has a circular portion.

13. The construction clip according to claim 7, wherein the construction clip is manufactured from at least one of the following: stainless steel, iron, aluminum, metal alloys, carbon, plastic, and/or any combination thereof.

* * * * *